US012410776B2

(12) United States Patent
Marsh (10) Patent No.: US 12,410,776 B2
(45) Date of Patent: Sep. 9, 2025

(54) SELF-REGULATING SMALL WIND TURBINE GENERATOR SYSTEM AND METHOD (71) Applicant: Daniel F. Marsh, San Antonio, TX (US)

(72) Inventor: Daniel F. Marsh, San Antonio, TX (US)

(*) Notice: Subject to any disclaimer, the term of this patent is extended or adjusted under 35 U.S.C. 154(b) by 0 days.

(21) Appl. No.: 18/144,311

(22) Filed: May 8, 2023

(65) Prior Publication Data

US 2024/0125300 A1  Apr. 18, 2024

Related U.S. Application Data (60) Provisional application No. 63/417,049, filed on Oct. 18, 2022.

(51) Int. Cl.
F03D 9/00 (2016.01)
F03D 9/25 (2016.01)

(52) U.S. Cl.
CPC .................... F03D 9/25 (2016.05)

(58) Field of Classification Search
CPC ......... F03D 9/25; F03D 7/0272; H02K 7/083; H02K 7/183; H02K 21/023; H02K 2201/03; H02K 2213/09; H02K 7/1838; H02K 1/24; H02K 24/24; H02K 41/03; H02K 37/02; F05D 2220/76; H02P 9/48; H02P 2101/15
See application file for complete search history.

(56) References Cited

U.S. PATENT DOCUMENTS

| 4,426,586 | A | * | 1/1984 | Cecchini | H02K 21/026 |
| | | | | | 416/DIG. 4 |
| 6,799,125 | B2 | | 9/2004 | Lau et al. | |
| 7,705,480 | B2 | * | 4/2010 | Nakamura | F03D 9/25 |
| | | | | | 290/43 |
| 8,022,581 | B2 | | 9/2011 | Stiesdal | |
| 9,046,075 | B2 | | 6/2015 | Kanemoto | |
| 9,677,544 | B2 | | 6/2017 | Li et al. | |
| 9,793,766 | B2 | | 10/2017 | Cortada Acosta | |
| 9,991,771 | B2 | * | 6/2018 | Zhu | F03D 7/0272 |
| 10,024,303 | B2 | | 7/2018 | Wakasa et al. | |
| 10,544,777 | B2 | | 1/2020 | Wakasa et al. | |
| 2013/0234543 | A1 | | 9/2013 | Buttner et al. | |
| 2013/0285501 | A1 | | 10/2013 | Staghoj et al. | |
| 2015/0145364 | A1 | | 5/2015 | Holcomb | |
| 2015/0354538 | A1 | | 12/2015 | McReynolds | |
| 2015/0357951 | A1 | * | 12/2015 | Han | H02P 9/02 |
| | | | | | 74/25 |
| 2016/0036308 | A1 | | 2/2016 | Bailey et al. | |

FOREIGN PATENT DOCUMENTS

EP  2604854 B1  2/2023
JP  2020156276 A * 9/2020

* cited by examiner

Primary Examiner — Julio C. Gonzalez
(74) Attorney, Agent, or Firm — The Langley Law Firm, P.C.

(57) ABSTRACT

A small turbine generator is connected to a wind turbine. The wind turbine spins freely due to a variable wind force on the wind turbine. The generator includes a spinning rotor that is responsive and spins proportional to spin of the wind turbine. A stator is connected to an actuator. The stator is selectively moved by the actuator nearer to or further from the rotor to vary the electrical power generated. Movement of the stator is controlled such that an electrical measure, such as voltage of the electrical power generated, does not exceed a threshold level.

3 Claims, 11 Drawing Sheets

| Station | Distance (ft) | Wind Speed (mph) | Voltage (V) | RPM | Switch Position |
|---|---|---|---|---|---|
| 4 | 43 | 25 | 45-70 | 500-1200 | No Tech |
|   | 43 | 25-26 | 56-63 | 500-1266 | W/ Tech |
| 5 | 30 | 33 | 90-103 | 1540-1760 | No Tech |
|   | 30 | 33-34 | 54-80 | 1548-1830 | W/ Tech |
| 6 | 25 | 40 | 105-111 | 1960-2000 | No Tech |
|   | 25 | 40 | 60-72 | 1890-2038 | W/ Tech |
| 6* | 25 | 40 | 86-103 | 1340-1873 | No Tech |
|   | 25 | 35 | 60-69 | 1420-1628 | W/ Tech |
| 7 | 20 | 45 | 109-115 | 1960-2090 | No Tech |
|   | 20 | 45 | 58-73 | 1960-2150 | W/ Tech |
| 8 | 15 | 50 | 113-120 | 2160-2202 | No Tech |
|   | 15 | 54 | 57-72 | 2150-2210 | W/ Tech |
| 9 | 10 | 55 | 119-122 | 2182-2224 | No Tech |
|   | 10 | 55 | 55-72 | 2180-2236 | W/ Tech |
| 10 | 5 | 60 | 122-125 | 2196-2236 | No Tech |
|   | 5 | 60 | 58-73 | 2190-2236 | W/ Tech |

SELF-REGULATING SMALL WIND TURBINE GENERATOR SYSTEM AND METHOD

TECHNICAL FIELD

The invention generally relates to wind energy and wind turbines, and more particularly relates to a self-regulating generator for a small wind turbine that is able to adjust output notwithstanding excess wind speed.

BACKGROUND

Wind energy is prolific. Energy from wind is thought to be cleaner and more abundant than traditional fossil fuels. Energy is gathered from wind typically by a bladed propeller of a wind turbine. As the propeller of the wind turbine rotates with the wind, an electricity generator is caused to rotate creating electricity.

An alternating current (A/C) electricity generator typically includes a stator, which is a stationary magnetic field. Within the magnetic field of the stator, an armature on a rotating shaft of the generator is caused to rotate by the turning of the wind turbine. The armature is, for example, a coiled copper or other metal wire. The shaft rotates on slip rings connecting respective ends of the wire of the armature. Respective conductive brushes of the generator contact the slip rings, respectively, to carry generated electricity on to a grid or circuit.

Because of wind speed and direction variation due to weather, voltage output from a wind turbine generator must be regulated. Regulation of the voltage of an electricity generator powered by wind has conventionally been effected by turning off or restricting the wind propeller rotation, varying blade angle or displacement of the propeller, or sending the generated electricity through resistor bank(s). These means for regulation of voltage have been problematic for a number of reasons.

Turning off or restricting the wind propeller rotation and varying blade angle or display each require mechanical complexity which is subject to malfunction, destruction, noise, vibration, or other issues. For example, extreme high winds can cause the propeller and other mechanical components damage. Further, if too high a voltage or amperage is output from the generator, downstream controls can be damaged and/or resistor banks or other components are required to discharge load from the turbine generator.

Conventionally, small wind turbines, which may be employed in residential homes, remote areas or otherwise, have controlled the generator by slowing the wind turbine rotation. This has often been accomplished by mechanically affecting the wind turbine. For example, tail yawing may be employed, in which the tail of the turbine turns the turbine from direct wind. However, this can create sudden noises and vibration because blades are suddenly cutting the wind at different angle. In other instances, blade furling may be employed in which blades are designed to self-distort in high winds. This varies aerodynamics of the wind turbine blades to change rotation speed and can consequently create noise and vibration. Yet other mechanical adjustment may be made to the blade pitch. Mechanical and/or electrical control mechanisms make the adjustments. In any event, control systems of small wind turbine generators that are suitable to avoid or limit problems have been complex, expensive and subject to damage or the like.

Small wind turbines are particularly susceptible to problems. The attendant cost and complexity of small wind turbines and generators has limited wider adoption and acceptance of the systems. Moreover, these systems have typically been higher priced than competing solar and other electrical energy generating sources. Wider adoption of small wind turbines and electricity generators is desirable for the environment. Also, these systems meet needs of those without access to other options or who favor clean energy source.

It would therefore be a significant benefit and improvement in the art and technology to provide wind turbines and generators, for example, small wind turbine generators, that overcome these and other problems and limitations. It would also be a significant benefit and improvement to provide lower cost and less complexity of these systems. It would be even further significant benefit and improvement to provide small wind turbine generators which are desirable in terms of costs, complexity, mechanics, noise, and other aspects.

SUMMARY

An embodiment of the invention includes a system. A wind energy drives a propeller. The system includes a rotor that spins responsive to the propeller and a stator that is movable with respect to the rotor. The stator is moved to obtain a desired generated electrical output.

Another embodiment of the invention is a small turbine generator. The generator is connected to a wind turbine. The generator outputs a generated electricity. The wind turbine spins freely. The small turbine generator includes a spinning rotor responsive and spinning proportional to spin of the wind turbine, a centrifugally static stator, an actuator connected to the stator, a guide shaft connected to the actuator, and a slider connected to and electrically shielded from the stator and slidably connected to the guide shaft. The actuator moves the stator on the guide shaft, in respect of the spinning rotor, to vary a voltage of the generated electricity.

Yet another embodiment of the invention is a method. The method includes moving a stator toward a magnetic field of a rotor if a voltage level of electricity generated is below an excess voltage level and moving the stator away from the magnetic field of the rotor if the voltage level of electricity generated approaches the excess voltage level.

Another embodiment of the invention is a method of operation of a small wind turbine generator. The small wind turbine generator is connected to a small wind turbine. The method includes rotating a rotor of the generator responsive and in steady proportion to spin of the small wind turbine, providing a stator in vicinity of a magnetic field of the rotor, generating an electric current of a voltage, signaling an actuator connected to the stator, the actuator positions the stator within the magnetic field of the rotor, and controlling the signaling to cause the actuator to position the stator closer to the magnetic field of the rotor to increase the voltage of the electric current and farther from the magnetic field of the rotor to limit the voltage of the electric current on reaching a threshold voltage.

Yet other embodiments of the invention include methods of manufacture of the embodiments of systems.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
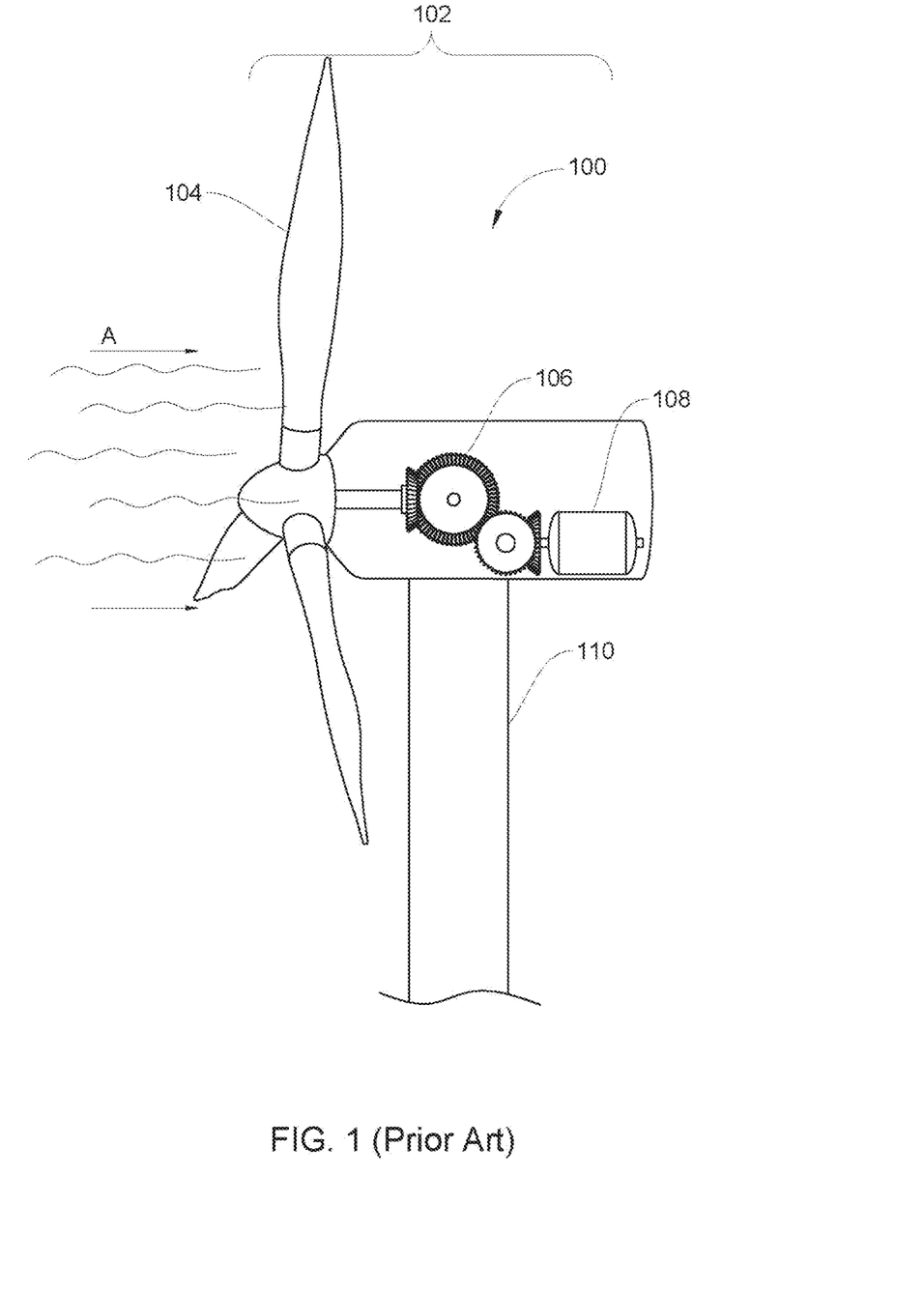
FIG. 1 illustrates a left side and partial cutaway view of a conventional wind turbine and wind turbine generator.

Referring to FIG. 1, a system 100 includes a wind turbine 102. The wind turbine 102 includes a propeller 104 connected to one or more gear 106. The gear 106 is connected to an electric generator 108. The wind turbine 102 may be rotatingly or otherwise mounted, for nonexclusive example, on a tower 110 or other mount. The wind turbine 102 may, but need not necessarily, include a vane (not shown) or other mechanism for rotating or moving the propeller 104 into a desired position for wind collection. For nonexclusive example, the propeller 104 is positioned to collect wind A. To vary voltage output by the electric generator 108, the propeller 104 is mechanically adjusted or otherwise controlled and/or excess voltage is off loaded by electric circuits and elements (not shown).

Figure 2:
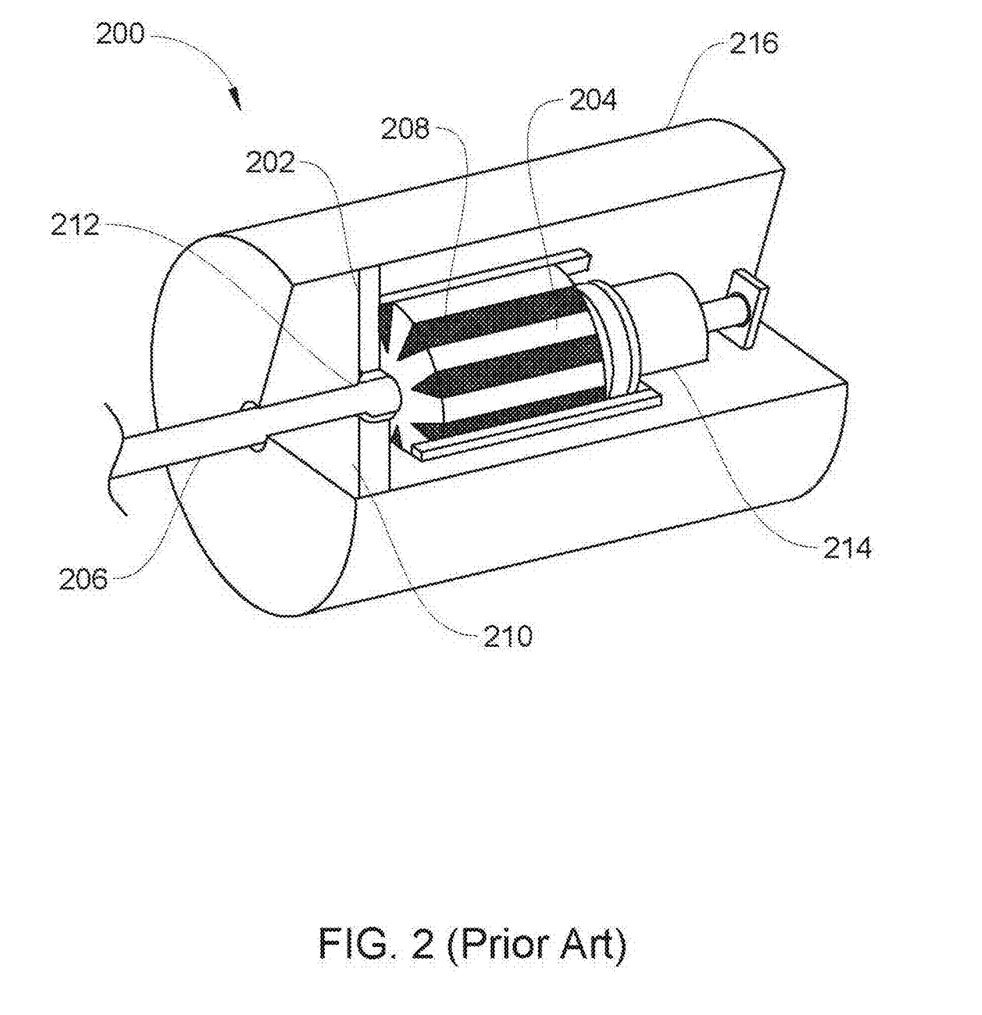
FIG. 2 illustrates a left and top side perspective and partial cutaway view of a conventional wind turbine generator.

Referring to FIG. 2, in conjunction with FIG. 1, an electric generator 200, such as, for nonexclusive example, the electric generator 108, includes a stator 202 and a rotor or armature 204. The stator 202 presents a stationary magnetic field. As nonexclusive example, the stator 202 is one or more magnet with copper windings. A rotating shaft 206 connects the armature 204 to one or more gear, such as for nonexclusive example, the gear 106 or other mechanical translator, and a rotating assembly, such as for nonexclusive example, a propeller 104 or other rotating device driven by the wind A.

The armature 204 includes, for nonexclusive example, field windings 208 of coil that, when moving within the magnetic field of the stator 202, generate electricity. One or more fixed support or frame 210 supports the armature 204. Bearings or slip rings 212 connected to the support 210 connect to the armature 204 to reduce friction of the rotating armature 204. A commutator 214 is connected to the armature 204 for conducting and collecting electricity. A brush assembly (not shown) of one or more brush contacts the commutator 214 to send generated electrical current on to a load, such as for nonexclusive example, a home electrical circuit and consequent elements for stabilizing and off-loading voltage. The voltage output from the generator 200 has been regulated in the manner previously described, primarily by varying rotation speed of the propeller 104 or other rotating device driven by the wind A.

Figure 3:
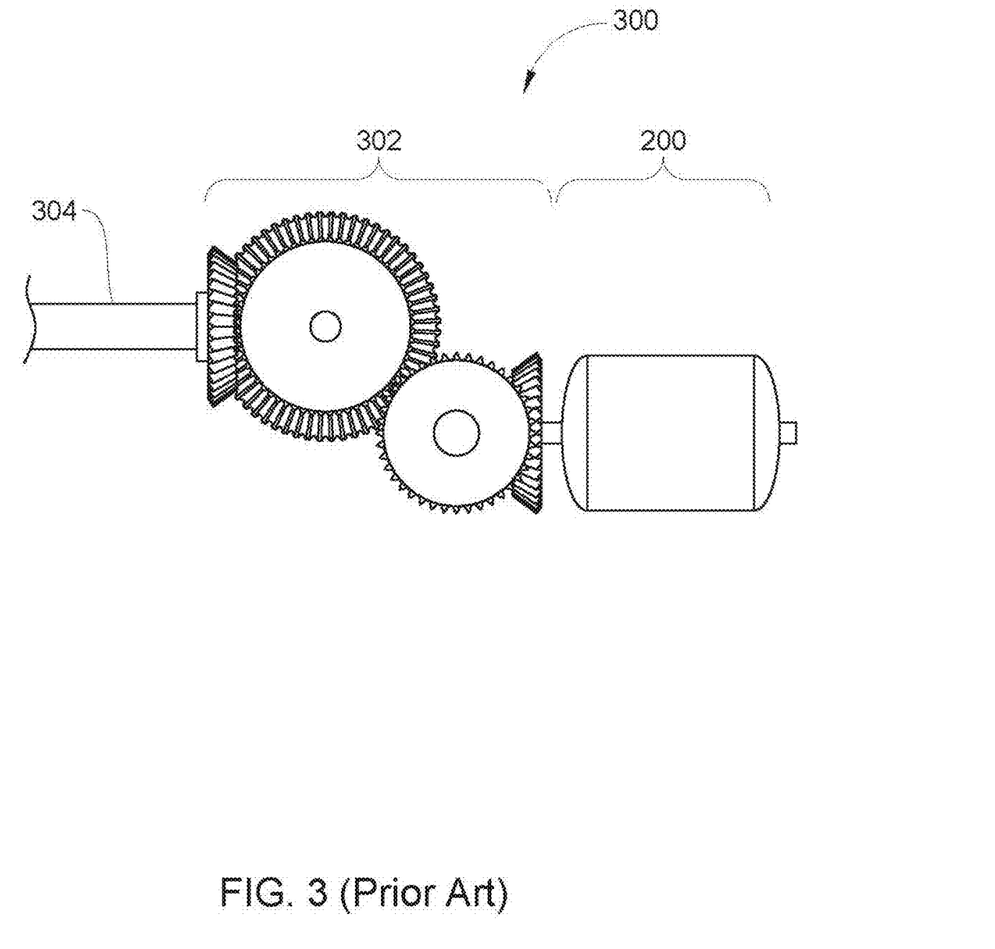
FIG. 3 illustrates a left side exploded view of conventional gears and wind turbine generator of FIG. 1.

Referring to FIG. 3, in conjunction with FIGS. 1 and 2, a gear assembly 302 connects to the generator 200 and to a rotating shaft 304 connected to a rotating device, such as for nonexclusive example the propeller 104. The gear assembly 302 may include one or more gear to translate the mechanical rotation of the propeller 104 or other rotating device driven by the wind A. The extent of translation of the mechanical rotation may be varied by virtue of the gear assembly 302 according to the application. In general, the gear assembly 302 for a small wind turbine 102 must translate mechanical rotation of the propeller 104 to rotate the rotating shaft 206 of the generator 200 in manner for generation of suitable electric output voltage of the generator 200. As nonexclusive example, an output voltage of about 80 $V_{dc}$ or less may be desired for a small wind turbine 102 servicing a home or residence.

Problems of excess output voltage can be presented in the foregoing because of several factors, as was previously discussed. These problems stem largely from the mechanical and electrical facilities that are presented. Mechanical features for varying the propeller speed, such as tail yawing, blade furling and blade pitch control, require mechanical movements or changes that are subject to damage or destruction and other obsolescence or issue. Moreover, there are limitations to the effectiveness of these mechanical features to vary propeller speed, particularly in high wind speeds. This results in requirements of electrical features to manage and/or off-load output power from the generator. Control systems for these environments can be complex and expensive. In any event, output power must be regulated in some manner to prevent overloads.

Figure 4:
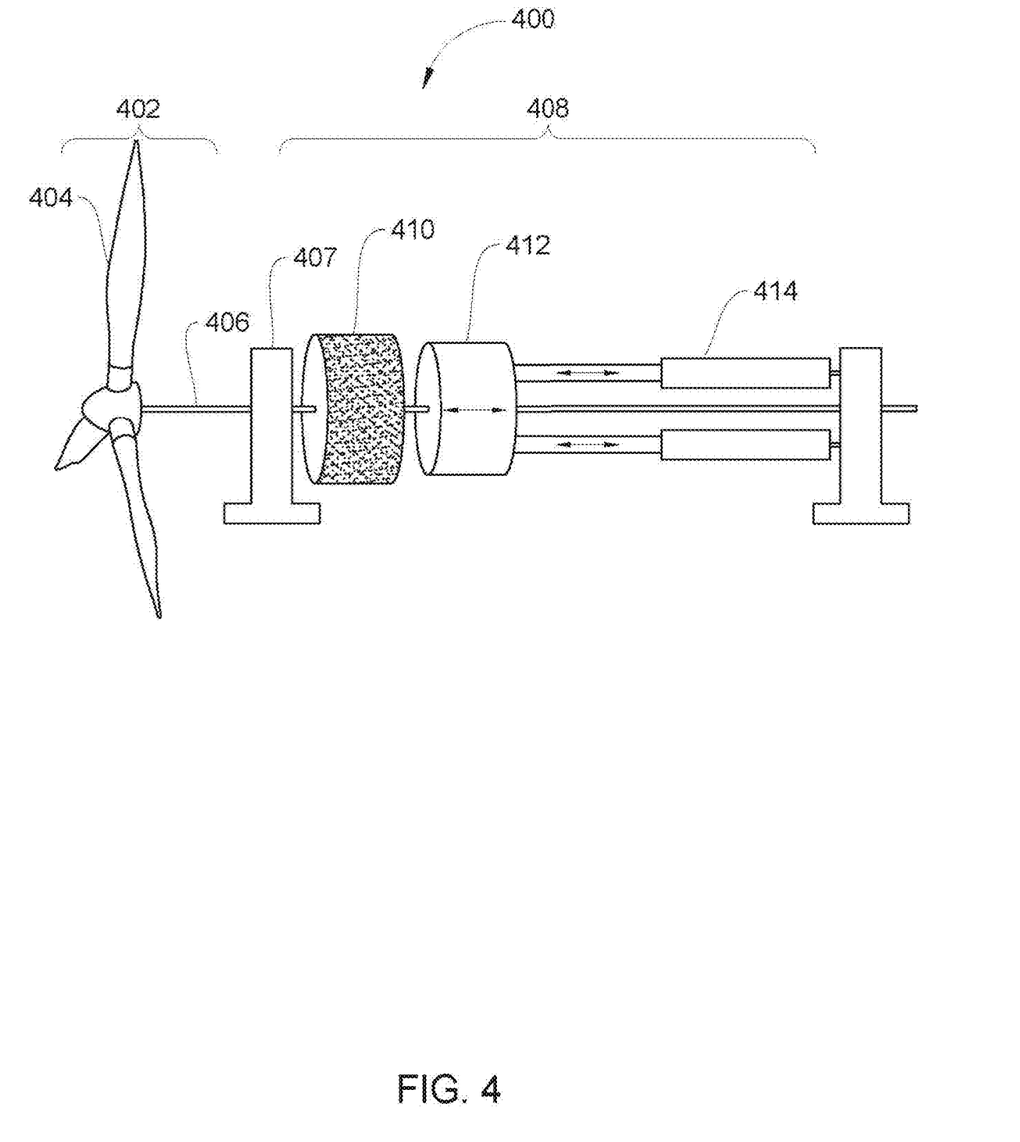
FIG. 4 illustrates a wind turbine generator connected to a wind turbine, according to certain embodiments of the invention.

Referring to FIG. 4, a system 400 includes a wind turbine 402. The wind turbine 402 includes a propeller 404 connected to a rotating shaft 406. The rotating shaft 406 is connected, for nonexclusive example, through one or more connected gear (not shown) as applicable, to a generator 408. The rotating shaft 406 is supported by a support 407.

The generator 408 includes a stator 410 and an armature 412 connected to an actuator 414. The generator 408 includes a frame 414 for retaining the stator 410 and the armature 412 in desired relationship. In the generator 408, the actuator 414 varies position of the armature 412 with respect to the stator 410 to consequently vary the output power of the generator 408. The stator 410 may, as nonexclusive example, include one or more magnet and coil winding. The actuator 414 may, as nonexclusive example, include a wound coil of the armature 412 that moves via the actuator 414 with respect to the stator 410, and rotates with wind against the propeller 404 outputting electricity. In effect, the actuator 414 changes the relationship of the armature 412 to the magnetic field of the stator 410. The opposite is also possible, such that the armature 412 includes one or more magnet and coil winding creating the magnetic field and the stator 410 includes the wound coil outputting electricity.

In any event, the armature 412 is variably positioned by the actuator 414 in relationship to the stator 410 in order to desirably vary the output voltage of the generator 408. This arrangement allows the propeller 404 to rotate without necessity of braking as via the problematic conventional mechanisms and operations. Moreover, this arrangement provides a suitable control of output electrical power from the generator 408 by virtue of the variable position of the armature 412 in the magnetic field of the stator 410 (or vice versa, as applicable in the embodiment).

Figure 5:
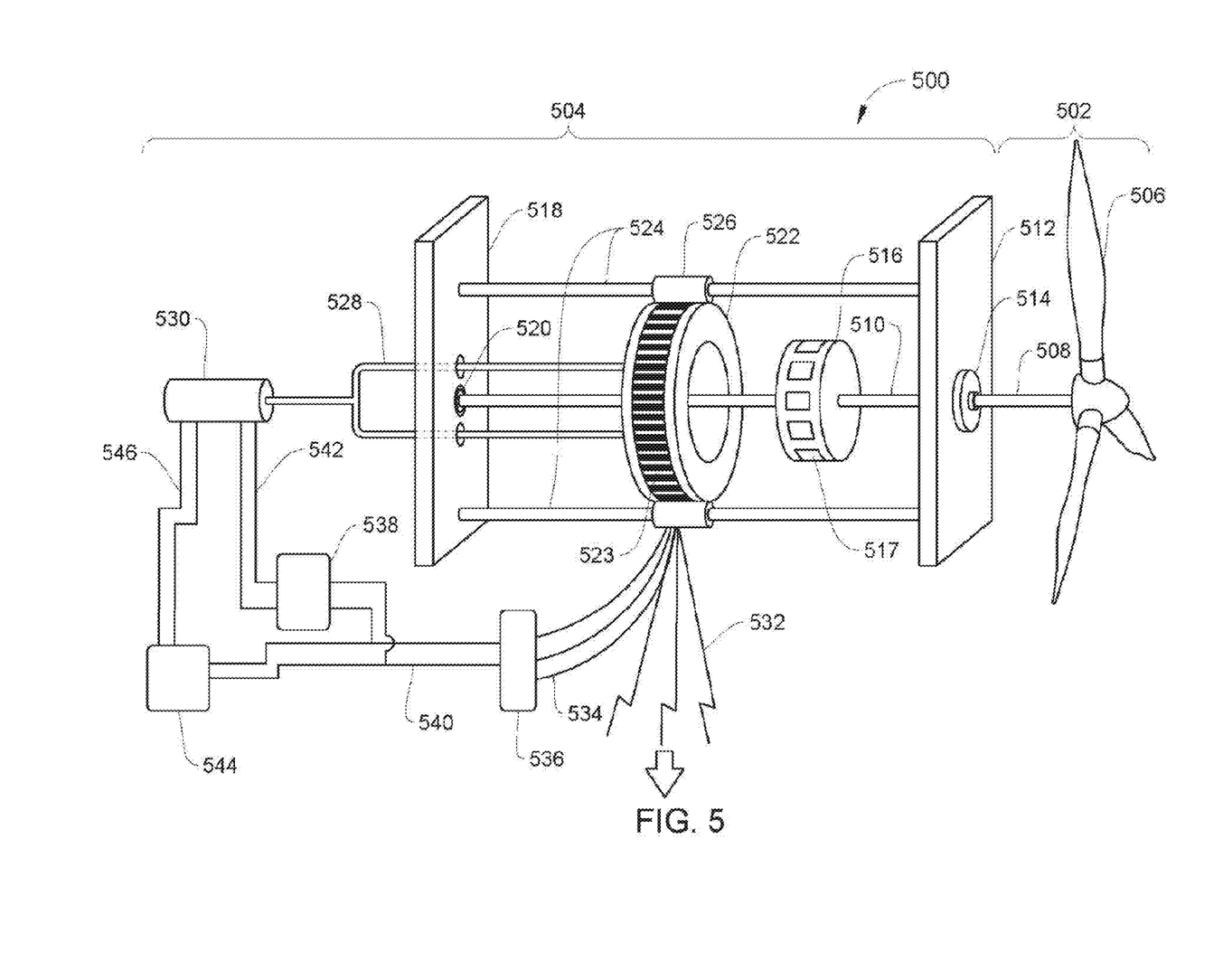
FIG. 5 illustrates an example of the wind turbine generator connected to the wind turbine of FIG. 4, according to certain embodiments of the invention.

Referring to FIG. 5, a system 500 includes a wind turbine 502 connected to an electrical generator 504. The wind turbine 502 includes a bladed propeller 506 connected to a turbine shaft 508. The bladed propeller 506 rotates due to wind forces and rotates the turbine shaft 508. Although not shown in FIG. 5, the turbine shaft 508 may connect to one or more gear to translate the rotational motion of the turbine shaft 508.

The turbine shaft 508, or if one or more gear then the gear(s), is connected to a generator shaft 510. The generator shaft 510 rotates in cooperation with the turbine shaft 508, either directly or through the one or more gear. A support 512 connects to a shaft bearing 514 through which the generator shaft 510 connects and rotates. The generator shaft 510 connects to a rotor 516 that spins with the generator shaft 510. The generator shaft 510 may additionally connect to another support 518 and another bearing 520 of the other support 518. In this manner, the rotor 516 spins in accordance with rotation of the generator shaft 510, whatever the wind force may be to the bladed propeller 506 correspondingly spin is imparted thereby to the generator shaft 510 and thus the rotor 516.

The rotor 516 is, includes or is connected to one or more magnet 517. Spin of the rotor 516 consequently spins the magnet 517. A stator 522 is selectively positionable within a magnetic field of the rotor 516. The stator 522 is, includes or is connected to one or more coil winding 523. The stator 522 may be selectively moveable relative to the magnetic field of the rotor 516. In certain non-exclusive embodiments, the stator 522 connects to one or more, for non-exclusive example two, four or other number, slide shaft 524. The slide shaft 524 is connected between the supports 512, 518. In the embodiment, the stator 522 is slidably connected to the slide shaft 524, for non-exclusive example, by one or more slide bearing, bushing or similar slider 526. The slider 526 is electrically shielded from the coil winding 523 of the stator 522.

An actuator 530 is connected to a bracket 528. The bracket 528 is connected to the stator 522, for non-exclusive example, through pathways of the support 518. The actuator 530 coupled to the bracket 528 pushes the stator 522 along the slide shaft 524. The stator 522, connected to the bracket 528, is pushed into and out of the magnetic field of the rotor 516 as it spins. Electrical current is generated in the coil winding 523 of the stator 522 when the stator 522 is positioned in the magnetic field of the rotor 516. This electrical current is output by the coil winding 523 to one or more wire 532, for non-exclusive example, three wires if 3-phase electrical current. A voltage output on the wire 532 is variable by displacing the extent of the coil winding 523 within the magnetic field of the rotor 516.

In certain nonexclusive embodiments, the electrical current of the coil winding 523 electrically connects by supply wires 534 to a bridge rectifier 536. The rectifier 536 is for nonexclusive example a diode that converts AC to DC power or similar elements. Voltage of the DC power from the rectifier 536 is electrically connected by output wires 540 to a voltage reducer 538. The reduced voltage signal from the voltage reducer 538 is electrically connected to the actuator 530 by actuator power wires 542. The actuator 530 is controlled to stroke the stator 522 position by another reduced voltage signal on wires 546. Another voltage reducer 544 electrically connected to the wires 546 is also electrically connected by the output wires 540 to the rectifier 536.

In operation, the rotor 516 spins according to rotation of the propeller 506 driven by wind energy. The stator 522 is selectively positioned within the magnetic field of the rotor 516 in order to obtain a desired output generated voltage. For nonexclusive example, greater voltage may be obtained when the stator 522 is positioned more in the magnetic field of the rotor 516 and lesser voltage may be obtained when the stator 522 is positioned less in the magnetic field of the rotor 516. The stator 522 is shifted in position by the actuator 530 and, if applicable, any bracket 528. The stator 522 is maintained from spinning by the slide shaft 524 and slider 526, or other frame or structure for selective displacement. As such electricity is generated by relation of the stator 522 to the rotor 516 spinning by wind force on the propeller 506, the generated electricity is output on the wires 532 and 534 or otherwise as desired in the application.

In certain nonexclusive embodiments, the systems and methods operate to generate electricity of desired voltage. For example, the propeller 506 may spin at whatever rate and the voltage of output electricity may be regulated by selective and moveable positioning of the stator 522 in relation to the magnetic field of the rotor 516. If the propeller 506 spins at a fast rate because of excessive or high wind, which could provide excessive voltage of output electricity, the stator 522 may be moved within the magnetic field of the rotor 516 to adjust the voltage output. This allows stabilization of voltage at about maximum (or other measure, as desired) without varying, braking, or otherwise distorting the propeller 506 or its rotation and without excessive or complex voltage offloading elements. Control system(s) for the positioning of the stator 522 in relation to the magnetic field of the rotor 516 can be widely varied as applicable for the embodiment and application.

Figure 6:
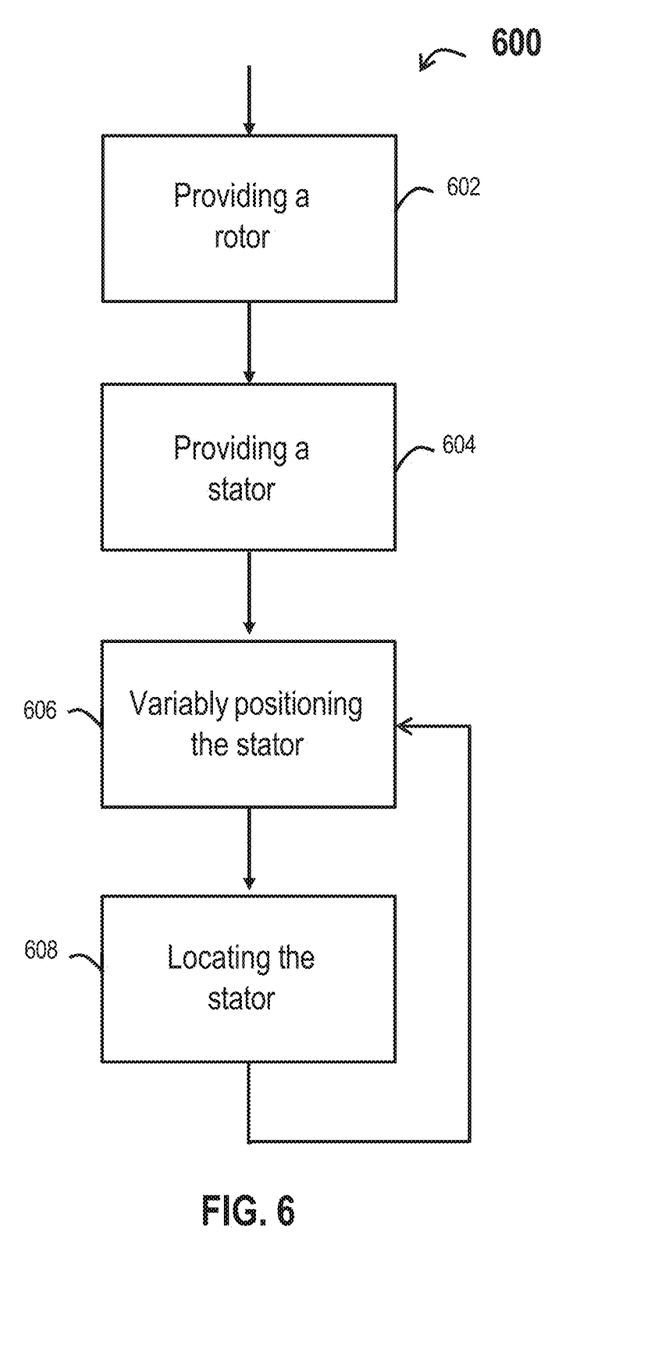
FIG. 6 illustrates a method for operating a wind turbine generator connected to a wind turbine, according to certain embodiments of the invention.

Referring to FIG. 6, a method 600 includes providing a rotor 602. The rotor spins responsive to an energy source, for nonexclusive example the wind. The rotor includes a first part of an electricity generator. The method 600 further includes providing a stator 604 for electrical generation interaction with the rotor. The stator includes a second part of an electricity generator. The method 600 also includes variably positioning the stator 606 in select spatial relationship with the rotor. The method 600 further includes locating the stator 608 by the variably positioning the stator 606 to obtain selective generation of electricity. By locating the stator 608 in position with respect to the rotor, the electricity generated is of a desired voltage, for nonexclusive example, voltage is limited to a maximum.

Figure 7:
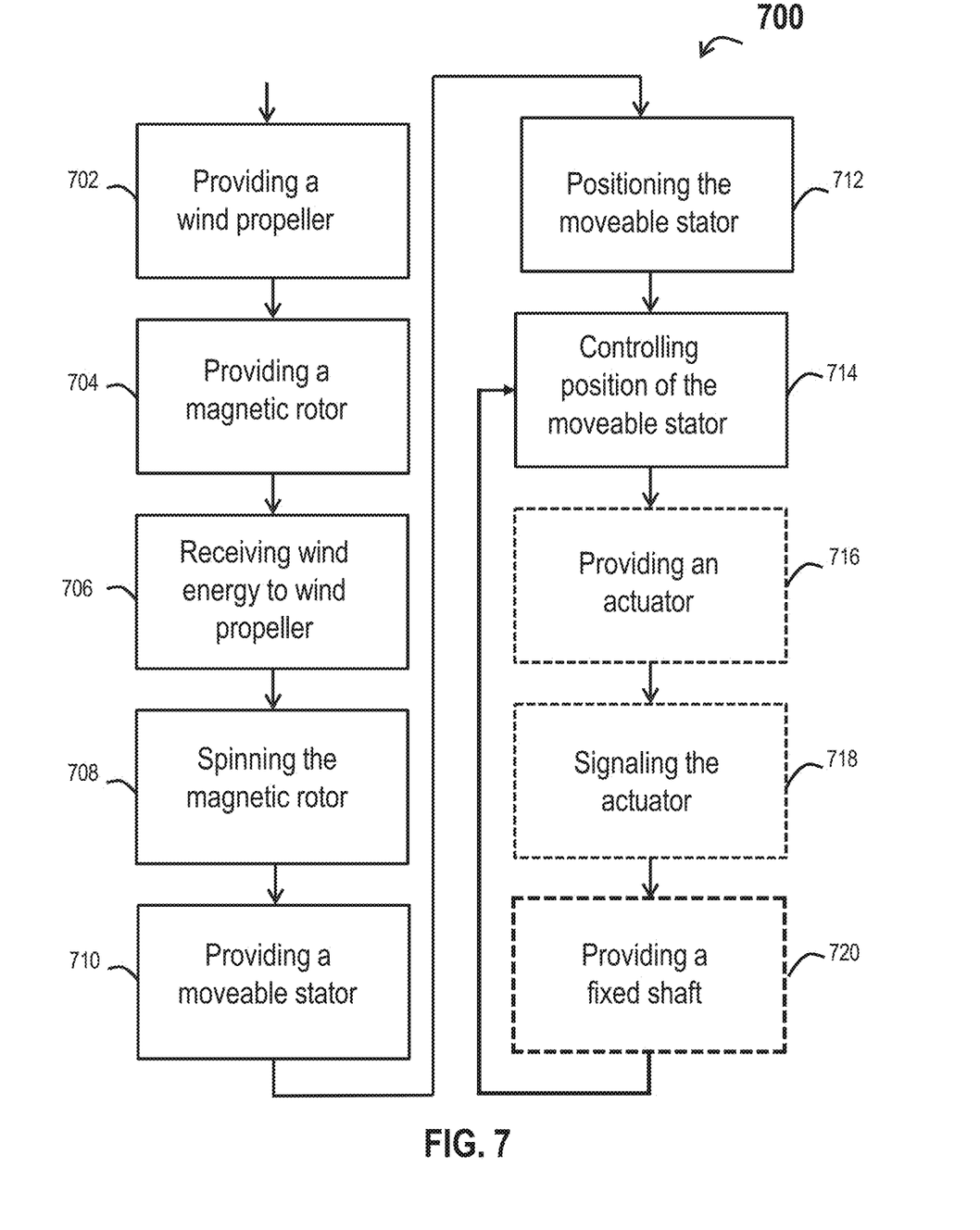
FIG. 7 illustrates a method of varying position of a stator to a rotor in a wind turbine generator for varying output electrical power of the generator, according to certain embodiments of the invention.

Referring to FIG. 7, a method 700 for converting wind energy to an electrical current includes providing a wind propeller 702 and providing a magnetic rotor 704 connected to the wind propeller. The method 700 also includes receiving the wind energy to the wind propeller 706 causing the wind propeller to spin. The method further includes spinning the magnetic rotor 708 responsive to wind force turning the wind propeller.

The method 700 additionally includes providing a moveable stator 710 for interacting within a magnetic field of the rotor. The moveable stator includes coil windings. The moveable stator is selectively positioned for obtaining select electrical current, such as for nonexclusive example a desired voltage or desired voltage limit. The method 700 may, but need not necessarily, also include positioning the moveable stator 712 to limit voltage of the electrical current to a maximum voltage measure.

The method 700 additionally includes controlling the position of the moveable stator 714 to allow the wind propeller to freely rotate without variation yet maintain the desired voltage limit of the electrical current generated. The method 700 may, but need not necessarily, include providing an actuator 716 connected to the moveable stator and signaling the actuator 718 to reposition the moveable stator based on the wind energy, for nonexclusive example, based on the speed of rotation of the wind propeller due to the wind energy. The method may, but need not necessarily, also include providing a fixed shaft 720 slidably connected to the moveable stator. The moveable stator slides along the fixed shaft responsive to the signaling the actuator 718, to position the moveable stator in select desired position within the magnetic field of the rotor.

Controlling the position of the moveable stator 714 may, but need not necessarily, include controlling by one or more computer or microprocessor. The control may but need not necessarily include options for control that may be manually or otherwise input or directed, as well as automated. In certain nonexclusive embodiments, the wind propeller is forced to spin by wind energy at spin rate that is not controlled or is only minimally controlled. In such instance, the moveable stator is selectively positioned in the magnetic field of the spinning rotor in order to regulate the electricity output. For nonexclusive example, the particular positioning of the moveable stator is determined according to limiting the output voltage to a maximum measure.

Figure 8:
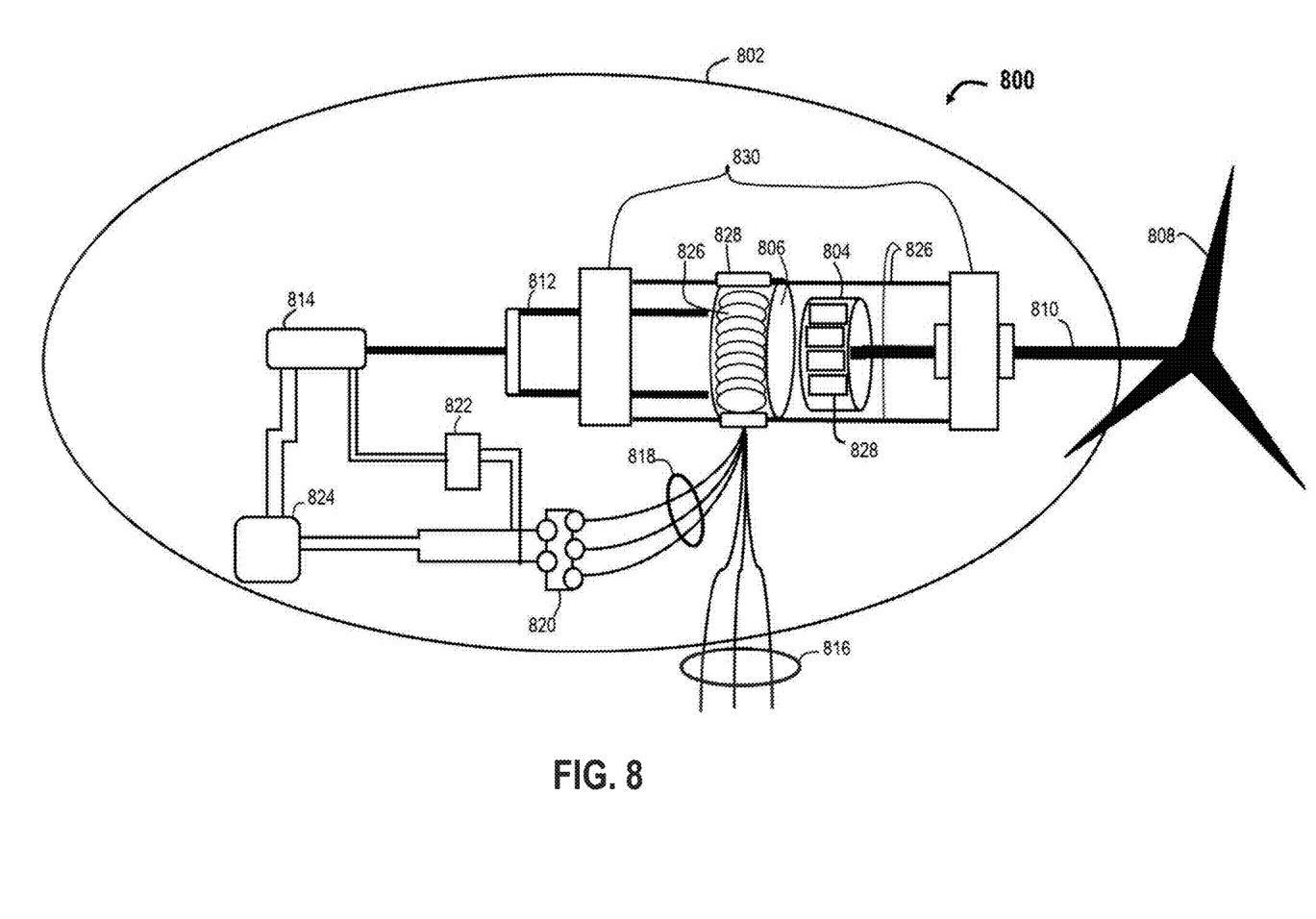
FIG. 8 illustrates a wind turbine generator system including a stator positionable in relation the a rotor for desired electrical output power, according to certain embodiments of the invention.

Referring to FIG. 8, a system 800 includes an electric generator 802. The generator 802. The generator 802 includes a rotor 804 and a stator 806. The rotor 804 spins as result of an energy source, such as for nonexclusive example, a shaft 810 connected, directly or indirectly, to the rotor 804 and to a spinnable wind turbine blade 808 or other element receiving wind energy or other energy source. The stator 806 is positionable with relation to the rotor 804.

The stator 806, for nonexclusive example, is connected to a linkage 812. The linkage 812 is communicatively connected to an actuator 814. An output electrical signal 816 and a control electrical signal 818 are, respectively, communicatively connected to the stator 806. The control electrical signal 818 is connected to a controller, for nonexclusive example, including a converter 820 communicatively connected to a regulator 822 and to a reducer 824. The controller is communicatively connected to the actuator 814.

For nonexclusive example, the stator 806 includes a coil winding 826 and the rotor 804 includes a magnet 828. Alternatively, the coil winding 826 may be included in the rotor 804 and the magnet be included in the stator 806. In any event, and whatever the stator 806 and rotor 804 may include, rotation of the rotor 804 in relation to the stator 806 creates the output electrical signal 816 and provides the control electrical signal 818.

As the rotor 804 spins, the stator 806 is positioned by the actuator 814 and the linkage 812 to vary a parameter or characteristic of the output electrical signal 816, such as for nonexclusive example to vary voltage output of the output electrical signal 816.

In certain nonexclusive embodiments, the stator 806 may ride on a guide 826 via bushing(s), bearing(s) or similar slider(s) 828 or other locating structures. In such nonexclusive embodiments, the guide 826 may be connected to a structure(s) 830. Of course, a variety of elements are possible for guiding the stator 806 in relation to the rotor 804. And in alternatives, the rotor 804 may be selectively moveable and positionable with respect to the stator 806.

Control of the actuator 814 may include the same or additional elements to those of the converter 820, the regulator 822 and the reducer 824. In certain nonexclusive embodiments, control of the actuator 814 is provided by a feedback mechanism or device in order to obtain a desired parameter or characteristic of the output electrical signal 816. Varying position of the stator 806 in relation to a magnetic field of the rotor 804, or vice versa, creates the desired output electrical signal or other output.

In operation, the rotor spins because of an energy source thereto, for nonexclusive example, wind on a propeller. The stator is moved towards and away from the rotor to obtain a desired characteristic of an output energy according to rotation of the propeller 506 driven by wind energy. As the stator is moved towards the rotor, voltage or other characteristic of the output energy is increased, and as the stator is moved away from the rotor, voltage or other characteristic of the output energy is decreased. By varying the position of the stator with respect to the rotor (or vice versa), a desired output energy may be obtained. As nonexclusive example, that output energy may have an excess threshold that is limited in the output energy through the operations.

EXAMPLE

In an example nonexclusive embodiment in accordance with the foregoing, a wind propeller is connected, directly or indirectly through gears, to a first electromagnetic part, such as a magnetic rotor providing a spinning magnetic field(s). A second electromagnetic part, such as a stator of coiled wire, is selectively positioned within the magnetic field(s) in order to maintain a maximum voltage level of about 70+/− volts of output electricity notwithstanding that the wind propeller may turn from excessive wind.

Figure 9:
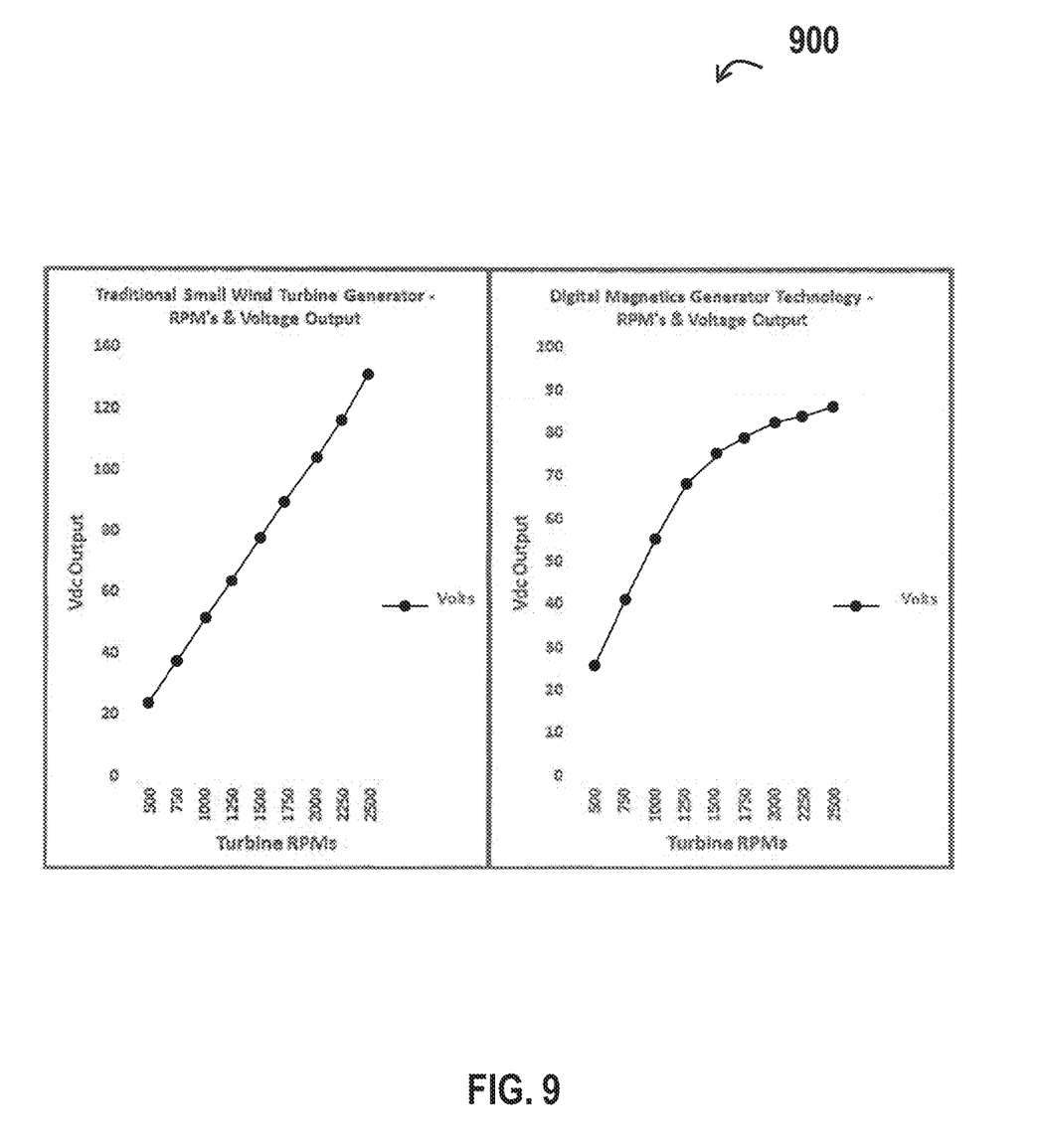
FIG. 9 illustrates test results obtained with an example wind turbine generator system, according to certain embodiments of the invention.

Test results 900 obtained for this example are shown in FIG. 9.

Where the left graph shows a conventional wind turbine generator output of electricity under wind turbine RPM rates, and the right graph shows a voltage output limit achieved by varying position of a stator with respect to a rotor under the same wind turbine RPM rates.

Figure 10:
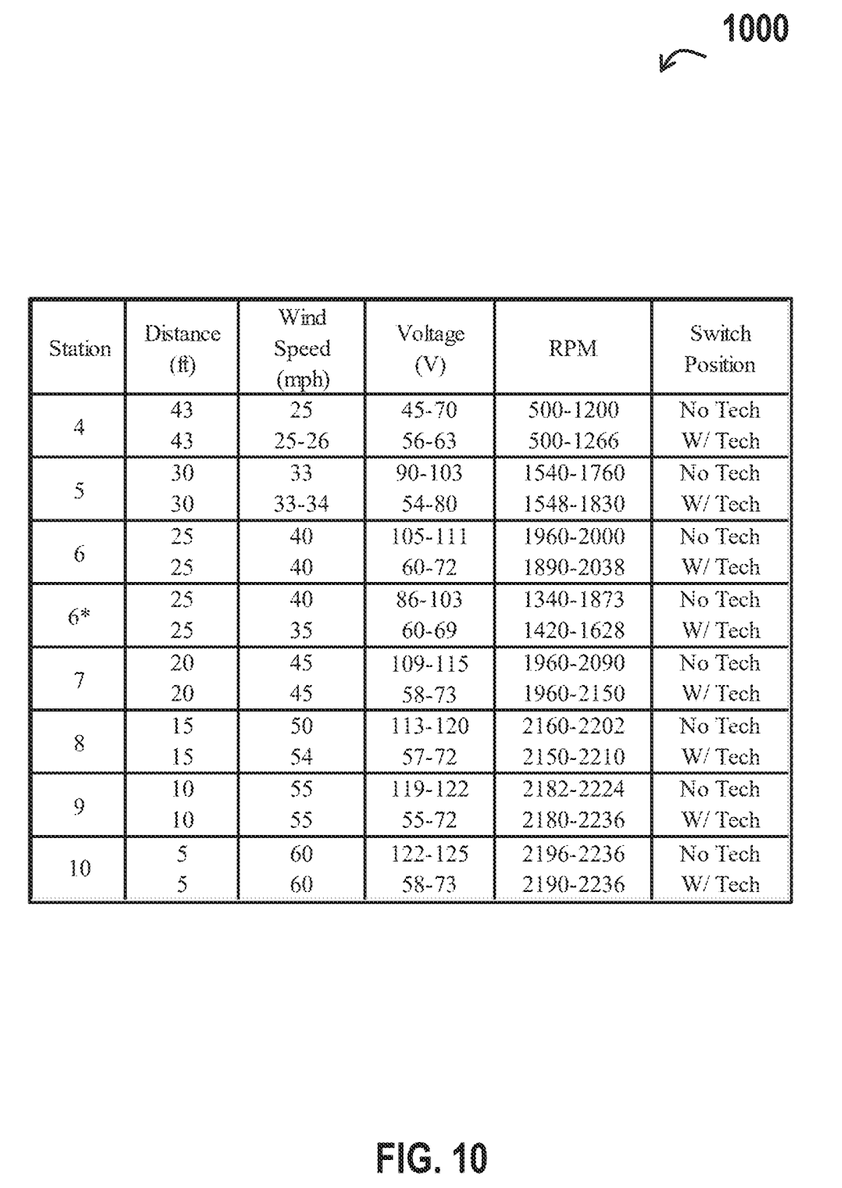
FIG. 10 illustrates other test data obtained with an example wind turbine generator system, according to certain embodiments of the invention.

Other test data 1000 for the example is included in FIG. 10.

Where "No Tech" indicates results of conventional wind turbine and wind turbine generator performance, and "W/Tech" indicates results of certain of the present embodiments.

Figure 11:
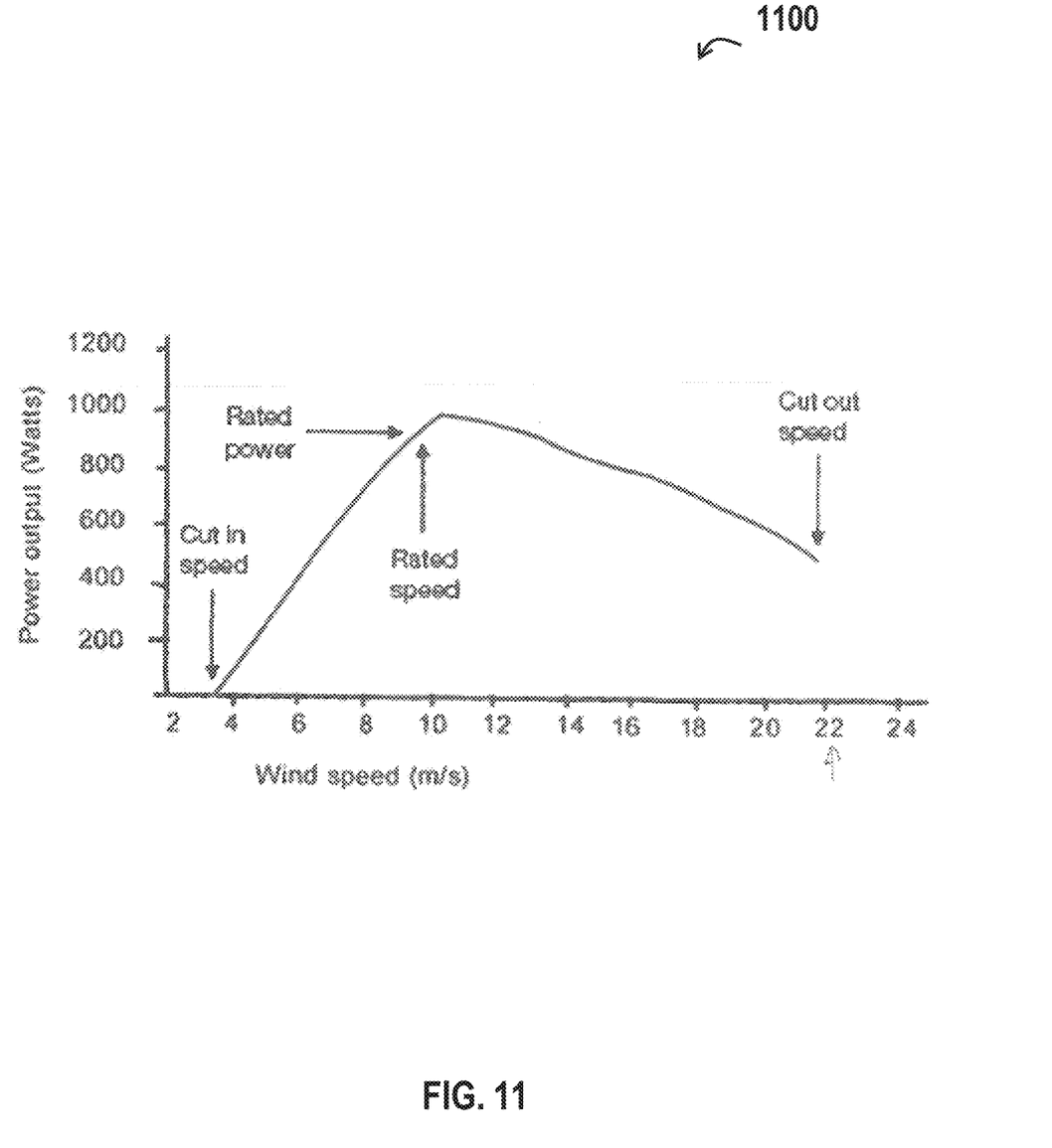
FIG. 11 illustrates certain power output of an example wind turbine generator at various wind speeds, according to certain embodiments of the invention.

Also, power output at various wind speeds measured for certain of the present embodiments is profiled 1100 in FIG. 11.

As will be understood, wide variation is possible in the foregoing embodiments. Although the rotor in certain embodiments includes magnets for a magnetic field and spins, the rotor could alternately be a spinning coil wire that electrically connects, such as by brushes or otherwise, to output electrical wires or elements. In such instance, the stator may include magnets rather than coil wire, and the magnetic field may be from the stator that is moveable with respect to the rotor to obtain a desired output electricity. Although three phase output AC electricity is generated in the foregoing embodiments, any other electricity that is generated in similar manner via moveable stator or rotor, as the case may be, within magnetic field is possible.

Though wind energy is described, other renewable or non-renewable energy sources, may drive the turbine generator, as applicable. For nonexclusive example, flowing water may provide the energy source. Specific elements of the wind turbine generator and its action are also subject to wide variation. Any similar self-regulating generator, of a sliding stator or rotor moveable within a magnetic field, can be employed to provide more or less electrical power, as per the applicable environment and application. For example, an actuator for moving the stator or rotor, as applicable, can be any of electric, electronic, pneumatic, hydraulic, spring, gas piston, or other. Also, for example, signal to trigger the actuator to move the stator or rotor, as applicable, can be any of electric, electronic, feedback, pneumatic, hydraulic, spring, digital, optical, laser, artificial intelligence, telepathic, or otherwise.

Although not detailed, housing of the unit or units of the turbine and/or the turbine generator can be contained in single or multiple housing or modules, and parts or all of the respective elements and units may be varied in any manner. Although housing of the turbine generator unit is illustrated as standalone, the separate parts or elements can be integrated into or with other devices or systems. Software, apps, or the like are possible for communication and control or otherwise, in the embodiments. Variation is also possible in the operations of the turbine generator and its scale. Although certain operations and elements for operation are disclosed, numerous other steps, operations, processes and methods, as well as other and similar elements, may be implemented in the systems.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications, substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A turbine generator, the generator is connected to a wind turbine with a propeller, the generator outputs a generated electricity, the wind turbine spins freely, comprising:
    a spinning rotor responsive and spinning proportional to spin of the wind turbine;
    a stator moveable along a linear axis relative to the rotor;
    an actuator connected to the stator and configured to position the stator relative to the rotor along the linear axis;
    a guide shaft connected to the actuator;
    a bearing connected to the stator, the bearing is electrically shielded from the stator, and slidably connected to the guide shaft; and
    a controller communicatively connected to the actuator and configured to continuously adjust the position of the stator along the linear axis in real-time based on measured electrical output; wherein the controller receives a voltage measurement of the generated electricity and adjusts the actuator:
    to move the stator towards the rotor along the linear axis if the voltage is below a threshold level; and
    to move the stator away from the rotor along the linear axis if the voltage exceeds the threshold level,
thereby dynamically regulating output voltage without requiring mechanical braking or electrical dumping; and
    the stator adjusts independent of speed variations of the rotor, enables voltage regulation without braking the wind turbine or propeller dynamics level and move the stator out of relationship with the rotor if the measured exceeds the threshold voltage level.

2. The turbine generator of claim 1, wherein
the
stator includes a coil winding and
the rotor includes a permanent magnet forming a magnetic field,
    wherein the actuator controls position of the stator to optimize the magnetic flux interaction for consistent electrical generation.

3. The turbine generator of claim 2, wherein the controller includes a processor and performs according to programming of the processor for signaling the actuator to move.

* * * * *